United States Patent [19]

St. Clair et al.

[11] 4,172,603
[45] Oct. 30, 1979

[54] SENSING APPARATUS WITH MECHANICAL ACTUATION SYSTEM

[75] Inventors: Donald R. St. Clair, Peru, Ill.; Richard C. St. John, N. Canton, Ohio

[73] Assignee: General Time Corporation, Thomaston, Conn.

[21] Appl. No.: 868,614

[22] Filed: Jan. 11, 1978

[51] Int. Cl.² .......................................... B60R 21/08
[52] U.S. Cl. ................................. 280/734; 180/282; 138/30; 200/61.53
[58] Field of Search ............... 280/734, 735, 736, 737, 280/738, 728, 729, 730, 731; 180/91, 103 A; 200/61.53, 250, 82 R; 138/30

[56] References Cited

U.S. PATENT DOCUMENTS

| | | | |
|---|---|---|---|
| 2,931,665 | 4/1960 | Sandor | 280/728 |
| 3,072,760 | 1/1963 | Hazen | 200/61.45 R |
| 3,319,420 | 5/1967 | Mercier | 138/30 X |
| 3,336,045 | 8/1967 | Kobori | 280/728 |
| 3,414,292 | 12/1968 | Oldberg | 280/728 |
| 3,547,467 | 12/1970 | Pociask | 180/91 X |
| 3,549,169 | 12/1970 | Oldberg | 180/103 A |
| 3,654,412 | 4/1972 | Haruna | 180/91 X |
| 3,789,949 | 2/1974 | Bortfeld | 180/91 |
| 3,793,498 | 2/1974 | Matsui | 200/61.45 R |
| 3,883,156 | 5/1975 | Frazier | 180/91 X |

FOREIGN PATENT DOCUMENTS 896312 10/1953 Fed. Rep. of Germany ........... 280/732

*Primary Examiner*—John P. Silverstrim
*Attorney, Agent, or Firm*—Pennie & Edmonds

[57] ABSTRACT

A sensing apparatus functions when the pressure in a sensing chamber attains a predetermined pressure level in response to a crash environment to actuate a pressure release valve and thereby provide an output resulting in the deployment of an air bag within the confines of a vehicle for restraining forward movement of an occupant. The particular level of pressure developed in the sensing chamber relates to the velocity of flow of a fluid under the control of a sensing means movable in the sensing chamber and whose movement, in turn, is responsive to the relative velocity of a vehicle and an impacted object. The operation of the impact sensing apparatus is the resultant of a true measure of the relative velocity of the vehicle and the impacted object; and upon attainment of a velocity of flow equal to or greater than a threshold velocity the pressure release valve will be actuated.

8 Claims, 3 Drawing Figures

SENSING APPARATUS WITH MECHANICAL ACTUATION SYSTEM

BACKGROUND OF THE INVENTION

There are numerous devices in the prior art whose primary function is to enable means for inflating an air bag within a vehicle for restraint of the occupants in the event of a collision. Those devices which have been proposed for vehicles of the automotive type generally are arranged in some fashion to respond to an impact of the vehicle with an obstruction or barrier thereby to deploy an air bag. It generally has been the practice to mount these devices on the vehicle in the region of and in association with the vehicle bumper or other front or rear end portion. Therefore, upon contact with an obstruction or barrier so as to deform or at least to yield in a crash environment a sensing mechanism in the device will respond to actuate means for inflation and consequent deployment of the air bag within the confines of the vehicle. The air bag so deployed then should be capable of carrying out its restraining function, i.e., to decelerate the forward momentum of the occupant following the collision. The ultimate aim is to prevent or at least reduce the chance of the occupant sustaining serious injury.

The prior art devices in large measure have not proved entirely satisfactory in operation. On particular problem with prior art devices is with regard to the speed of operation, i.e., the response time $(T_2-T_1)$ encompassing the interval between initial contact $(T_1)$ and terminating with an output $(T_2)$ resulting in inflation of the air bag. It should be appreciated that the deployment of the air bag should occur within an extremely short interval of time following a collision, otherwise there will be a diminution or loss of any safety factor since the occupant will have achieved a significant relative velocity with respect to the inside of the vehicle. The significance of a rapid response to the condition may be appreciated when it is considered, for example, that a bumper or other front or rear end portion of the vehicle hitting an obstruction or barrier at 55 mph is displaced approximately 3 inches in about 2.5 milliseconds time.

In addition, many of the prior art devices suffer from a problem characterized as a general inability to prevent deployment of the air bag upon impact of the vehicle with an obstruction or barrier when the vehicle is traveling at a low velocity. Normally, deployment of the air bag under this condition would not be required for safety purposes and, further, the deployment of the air bag at this time and under the circumstances possibly could result in injury to the occupant. Another aspect of this problem is the inadvertent deployment of the air bag in a "g"-type sensing device. In such a device, it is not uncommon to obtain a response to ordinary shock and vibration encountered in ordinary use of the vehicle. This aspect has its genesis in a difficulty in discriminating between a crash "signature" on the one hand and road shock, vibration, side impact or the equivalent on the other. Each vehicle has a slightly different "signature", the characteristics of which are dependent upon such factors and/or characteristics of shock absorbers, undercoating and frame rigidity, to name a few. And, as the vehicle ages, it is common that the factors and/or characteristics may change thereby changing this "signature". Thus, the device, first, must be tailored to the particular vehicle, and tailored again as, for example, aging sets in.

A further problem associated with certain of the prior art devices resides in a complication of constructions and lack of universality of their adaption to vehicles both of standard size and those of smaller and lighter size. Specifically, many of the known prior art devices for enabling inflation of an air bag within the confines of a vehicle are relatively large in size and weight. This is an important factor with many of the newer models.

One device which is representative of a segment of the prior art is described in U.S. Pat. No. 2,931,665 to Sander. Sander essentially describes the device as including an hydraulic system which actuates a switch during impact of the vehicle. Disadvantages associated with the Sander device are that it is extremely complicated in both construction and mode of operation, requiring several components and it must be especially adapted to various types of vehicles. A further disadvantage resides in the fact that a fluid pump must be operated in response to movement of the vehicle to properly enable actuation of the safety device. Accordingly, should the vehicle be stationary upon impact by a moving object, the air bag would not be deployed.

Another device representative of a further segment of the prior art is described in U.S. Pat. No. 3,072,760 to Hazen. This particular device is dependent upon acceleration of the vehicle for actuation of means for deployment of an air bag. A shortcoming of the Hazen device and others of similar nature is that its operation is dependent upon the physical crushing characteristics of the impacted object. Thus, the response time for the deployment of the air bag is determined, in part, by the particular physical properties of the obstruction. As a consequence, the device may not be actuated properly within the intended time interval should other than standard so-called barrier type objects be impacted.

Moreover, known devices of this type suffer from an additional problem in that their operation is dependent upon actual deformation of the vehicle during impact. And, if the device is to perform in the intended manner, it may, of necessity, require a specific construction for each model vehicle. Thus, this lack of universality renders them materially less versatile than might be otherwise possible.

SUMMARY OF THE INVENTION

As should readily be appreciated from the above discussion, there are physical contact and time requirements which must be taken into account if the deployment of the air bag is to be accomplished in an extremely rapid manner. This is important because the shorter the response time the longer the allotted time to deploy the air bag before the occupant of the vehicle has attained a significant relative velocity with respect to the interior of the vehicle. Also, it should be appreciated that it is important that the operation of the impact sensing apparatus be in response to and a true measurement of the relative velocity of the vehicle and the impacted object, such as an obstruction or barrier, notwithstanding the physical characteristics of the obstruction or barrier impacted or the particular deformation resulting from impact. The prior art devices have been found somewhat deficient in meeting these criteria. It should, further, be appreciated that the impact sensing apparatus not respond to spurious inputs, such as developed from shock, road vibration, etc.

The present invention is directed to an improved sensing apparatus for use with a vehicle. As an important aspect, the sensing apparatus of the present invention has capability of overcoming the enumerated problems and drawbacks, as well as others, of the prior art by a device whose response is both rapid and reliable. As will be described, the sensing apparatus of the present invention is capable of activating deploying means for deployment of an air bag for restraint of the occupant of a vehicle in an extremely rapid and reliable fashion. Such deployment is in response to and a true measurement of the relative velocity of the vehicle and that of the impacted object. The response is by way of an output indicative of attainment of a level of pressure in a cylinder which shall be equal to or greater than a predetermined pressure caused by the flow of a fluid at or above a threshold velocity. If the flow of the fluid is below the threshold velocity, there will be no output.

The output will comprise the input for activation of apparatus for deployment of an air bag within the confines of the vehicle thereby to restrain an occupant upon occasion of a crash.

Importantly, the deployment of the air bags is in response to a true measurment of the relative velocity of the vehicle and that of the impacted object.

Broadly, the sensing apparatus of the present invention contemplates a main sensor unit fixed to a portion of the chassis closely adjacent to a bumper or other front or rear end portion for conjoint movement with the chassis and responsive to yielding and/or deformation of a bumper or end portion. The sensor unit is formed by a housing including a pair of sealed chambers in fluid communication through an orifice. One chamber comprises a cylinder while the other chamber comprises an accumulator adapted to receive surges of a fluid which shall flow through the orifice. The orifice normally is closed by a pressure responsive member movable in the accumulator against a biasing force upon displacement of the fluid from the cylinder which, in turn, results from displacement of an impact responsive member or sensing means movable in the cylinder and, also, in opposition to a yielding force. Fluid is supplied to the cylinder from a reservoir so that the cylinder normally is filled. And, the sensing means translates from one position to another in response to a yielding and/or deformation of the bumper or end portion in a crash environment.

The orifice is shaped and sized for creating at least a predetermined pressure level within the cylinder when the fluid shall flow at a velocity at least equal to a threshold velocity. The sensing apparatus utilizes the characteristics of fluid flow through an orifice in operation. When the sensing means moves in response to a crash, the fluid is forced through the orifice, the flow being either in a laminar pattern or in a pattern turbulent in nature depending upon the speed of movement of the sensing means and fluid. A pressure, the resultant of the velocity of flow of the fluid, will exist across the orifice. The speed of movement of the sensing means is dependent upon the relative velocity of the vehicle and that of the impacted object. When the relative velocity results in a flow of fluid at a velocity below a predetermined threshold, the pressure in the cylinder will be insufficient to provide an output for deployment of the air bag. However, when the relative velocity results in a flow of fluid at a velocity equal to or greater than the predetermined threshold, the pressure across the orifice is sufficient to provide an output. The pressure across the orifice develops upon the flow of fluid becoming turbulent through a throttling action and as the flow icreases in velocity it becomes more turbulent and the pressure builds rapidly. A pressure release valve is responsive to the pressure in the cylinder and when the pressure is at the predetermined level the pressure release valve opens thereby to open fully a line for communicating cylinder pressure to a release-reservoir unit. The opening of the pressure release valve may be considered an output.

The release-reservoir unit functions both to supply the fluid to the main sensor unit and to respond to the output indicative of a pressure in the cylinder of the main sensor unit having attained a predetermined level. The release-reservoir unit is in the fluid communication with the cylinder by way of a fluid line including a release cylinder at one end and the pressure release valve of the other end which substantially closes the cylinder of the sealed chamber. A bleed orifice provides a by-pass around the pressure release valve and a second and larger bleed orifice communicates with a reservoir and the release cylinder. A store of fluid in the reservoir maintains the fluid line filled. And, any fluid which shall enter the fluid line from the cylinder of the sealed chamber through the first bleed orifice will pass through the second bleed orifice into the reservoir rather than in any way pressurize the release cylinder.

This may occur in response to changes in the volume of fluid because of changes in ambient conditions and on the occasion of a "low impact" speed crash during which there is movement of the sensing means. The release-reservoir unit also includes a detonator operable when the pressure in the cylinder attains the predetermined level to actuate the pressure release valve. The operations described are purely mechanical.

It is an important aspect of the present invention that the operation of the sensing apparatus be in response to and a true measurement of the relative velocity of the vehicle and the impacted object. In this connection, it is the pressure within the cylinder that provides an output and the pressure is developed or produced only by the capability of flow of fluid through the orifice. If the relative velocity of the fluid is at least equal to a threshold velocity resulting from movement of the sensing means, the fluid is throttled by the orifice so that the flow becomes turbulent resulting in a build-up of pressure in the cylinder equal to or greater than that required to provide the output.

For purposes of discussion, "threshold velocity" is to be considered the minimum flow velocity capable of providing an output. Also, reference to "occupant" shall be considered to include one or more persons in the vehicle front seat as well as those in rear seats which likewise may be protected through the deployment of an air bag. And, a "low speed" crash as distinguished from a "high speed" crash may be considered one in a crash environment wherein the relative velocity of the vehicle with respect to the impacted object is such that no output is obtained. In the present invention there will be an output when the relative velocity is 12 miles per hour (mph) although a relative velocity which either is less or greater than 12 mph may be decided upon. Thus, a "low speed" crash would be the result of a relative velocity of less than 12 mph.

DETAILED DESCRIPTION OF THE DRAWING

Figure 1:
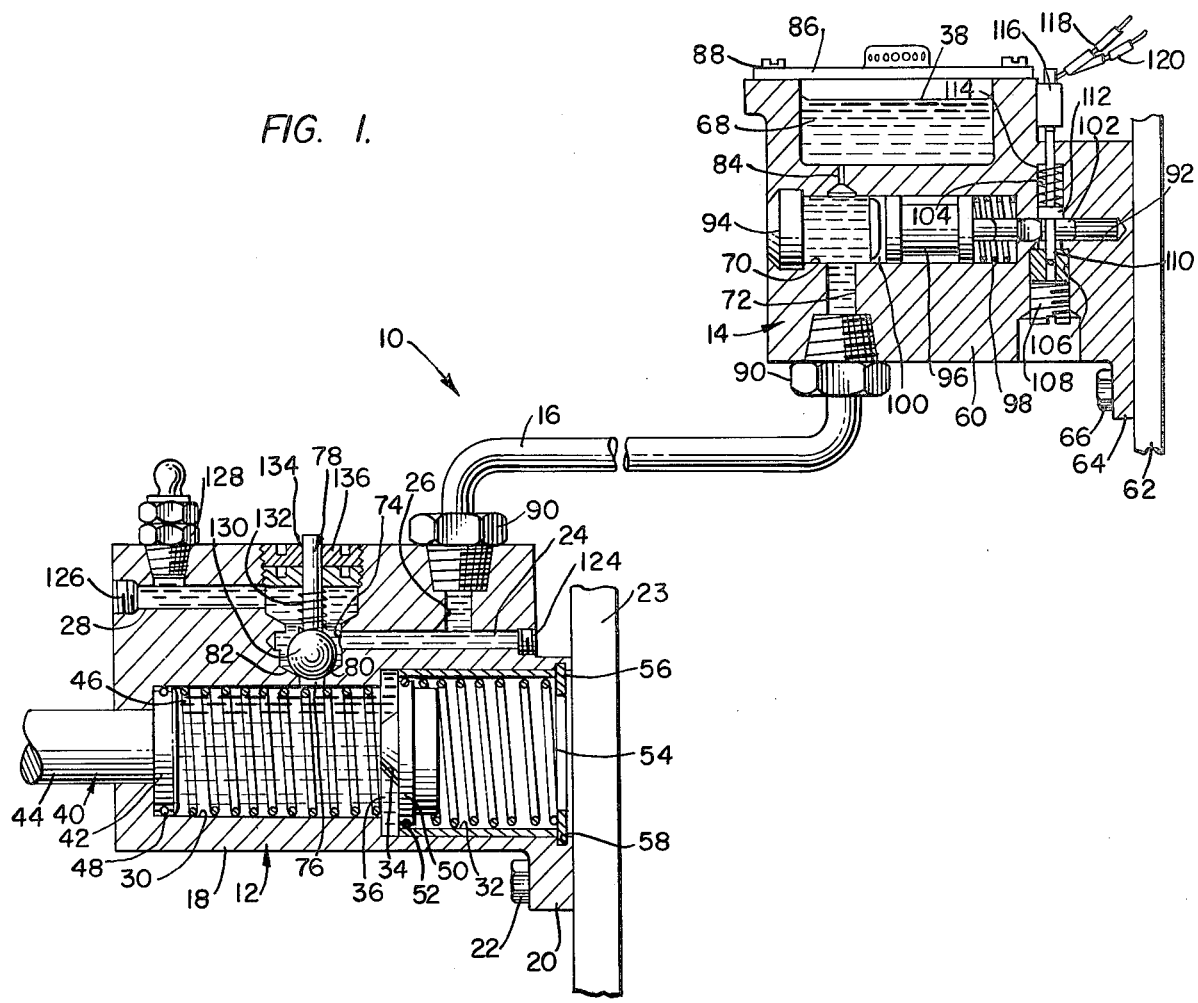

The above, as well as other aspects, features, and advantages of the present invention will become readily apparent upon a reading of the detailed description and its consideration in conjunction with the accompanying drawing wherein like reference indicate like structure throughout the several views. In the drawing, FIG. 1 is a diagrammatic presentation of the sensing apparatus of the instant invention; and, FIG. 2A and 2B are partial views, somewhat enlarged, illustrating sequentially the operation of a mechanical detonator.

DETAILED DESCRIPTION

Figure 2A:
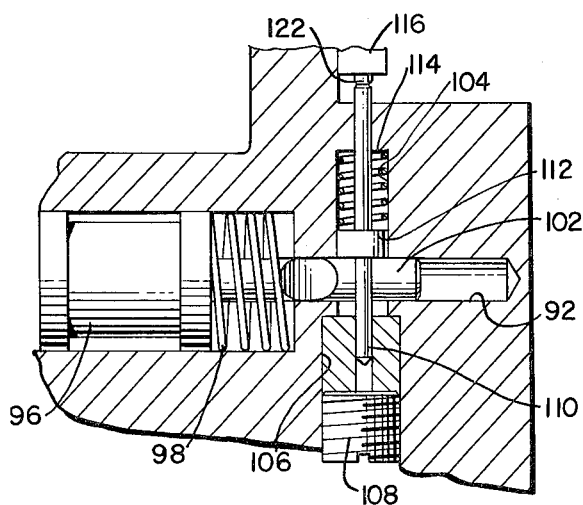
Figure 2B:
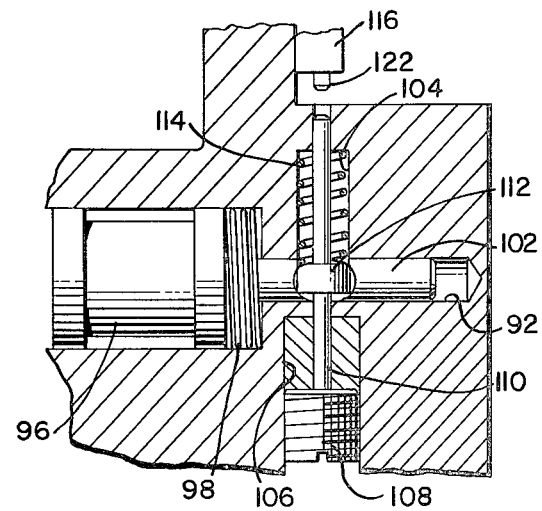

The sensing apparatus of the present invention generally is designated by reference numeral 10 in FIG. 1. The sensing apparatus to be described as the discussion continues is capable of an extremely rapid and reliable operation in the deployment of an air bag or the like; and, it has particular applicability for use in conjunction with a vehicle such as an automobile for restraint of an occupant in response to an impact wherein the relative velocity of the development of a predetermined pressure in a cylinder. The predetermined pressure causes an output which is communicated to a detonator for inflating an air bag (not shown). The purpose of the air bag when inflated is to decelerate forward movement of the occupant within the vehicle so that the occupant in a crash environment does not attain a significant relative velocity with respect to the interior of the vehicle.

The sensing apparatus is adapted for use with a vehicle without regard to size or type. However, it is important that the sensing aparatus be rigidly mounted to the chassis in close proximity to the bumper or front or rear end portion of the vehicle. By this arrangement, the sensing apparatus will be movable conjointly with the vehicle and will sense immediately a yielding and/or deformation of the bumper or end portion. The sensing apparatus provides a significant advantage over prior art devices in that it need not be constructed to conform to the "signature" of a particular make and model vehicle. Rather, the apparatus may be mounted on and used with substantially any vehicle without modification to the latter for accommodating the former and vice versa. While the description is to the use of a single sensing apparatus, more than one may be used as circumstances dictate. To this end, a sensor unit and a release-reservoir unit which together with a connecting fluid line comprise the sensing apparatus may be duplicated, for example, or multiple sensor units may be in fluid communication with a single release-reservoir unit. The sensor units may be adapted to provide an output upon attainment of a level of pressure in their respective cylinders which in all instances is the same or the levels may be different. And, it is contemplated that the sensor units which provide an output upon the attainment of different pressure levels may be connected to individual release-reservoir units thereby to deploy an air bag within the range of a "low impact" crash and an air bag in a "high impact" crash.

The sensor unit is denoted by the numeral 12 and the release-reservoir unit is denoted by the numeral 14. The two units are connected by a conduit 16 providing the fluid line for purposes as will be discussed below. Essentially, the sensor unit of the sensing apparatus functions to provide an output comprising an input to the release-reservoir unit and detonation apparatus for inflating the air bag. As discussed, this action occurs when the relative velocity of the vehicle with respect to the impacted object results in a flow of fluid at a velocity equal to or greater than a predetermined threshold velocity. No output will be provided if the relative velocity of the vehicle with respect to the impacted object results in a flow of fluid at a velocity less than the predetermined threshold velocity.

Referring to FIG. 1, the sensor unit is formed by a housing 18 which preferably is disposed on the chassis of the vehicle in the area between the chassis and a bumper or front or rear end portion thereby to be responsive immediately to a yielding and/or deformation that these structures may undergo. The sensor unit may be located either to the front or the rear of the vehicle and several units may be employed within the scope of the present invention.

The housing may be mounted to the chassis of the vehicle in any manner and by any means as may be convenient or which may be required because of the particular mounting location. Thus, the housing may include a flange 20 having a plurality of bores (not shown), each receiving a bolt 22 adapted to be threaded into the chassis identified generally by the numeral 23. The flange may extend around or partly around the housing and the bores will be spaced apart equidistantly. A plurality of flow paths 24, 26 and 28 and a pair of chambers comprising a cylinder 30 and an accumulator 32 are formed in the housing. The chambers communicate one with the other through an orifice 34 formed in a wall 36. Preferably, the housing 18 will be formed of a relative rigid and durable material such as stainless steel, or the equivalent.

Operation of the sensor unit 12 as described to this point utilizes the principles of flow of fluid through an orifice. To this end, fluid will flow substantially in a laminar pattern through the orifice at fluid velocities below a threshold velocity. As the flow increases in velocity, a level will be reached at which the orifice begins to have a significant throttling effect on that flow. The effect of throttling is that the flow which theretofore was laminar becomes turbulent and pressure builds within cylinder 30 on the "upstream" side of the orifice 34. When the velocity of flow is equal to or greater than the threshold velocity, the degree of turbulence will result in a pressure which causes an output represented by actuation of a pressure release valve to be described. The greater the relative velocity of the vehicle with respect to the impacted object, the greater the velocity of flow of fluid in the cylinder with the result that an output will be derived more rapidly. Thus, as the velocity increases, response time decreases.

The cylinder 30, as described, is in fluid flow communication with the interior of the accumulator 32 and with a fluid reservoir 38 included in the release-reservoir unit 14. The manner of fluid flow communication will be brought out in greater detail as the discussion continues and as generally discussed. The purpose of communicating the cylinder and reservoir is to maintain the cylinder filled at all times irrespective of the position of the sensing means. The fluid which has been used successfully in carrying out the present invention is silicone oil. An advantage of this medium is that it is capable of operation throughout a temperature range of from about $-20°$ F. to about $280°$ F. without a change in viscosity to hamper operation. However, since the flow across the orifice is essentially frictionless, viscosity problems should not occur. Other liquids, such as brake fluid and the equivalent can be used also.

The cylinder 30 and accumulator 32 substantially are closed and the disposition of fluid, normally confined in the cylinder, is controlled by a sensing means 40 in the form of a piston and a rod 44. The head acts upon to impart movement to the fluid under control of the rod which extends outwardly of the housing 18 to a position in juxtaposition to the bumper or end portion for direct response upon any amount of yield and/or deformation in a crash environment. The piston 40 normally will be disposed to the left end of the cylinder as seen in FIG. 1 because of the loading effect of spring 46 or the equivalent. An O-ring 48 or some other conventional means preferably will be disposed to complete the seal between the head 42 of piston 40 and the bore of the cylinder. To this end, the O-ring is received in a groove 49. A boot (not shown) may be supported by the housing in a disposition around the rod 44 for added prevention against the ingress into the cylinder of dirt, grit or other debris which would have a deleterious effect on the overall operation of the sensing apparatus.

The accumulator 32 as the name suggests provides the function of accumulating surges of flow of fluid from the cylinder upon movement of the piston. The accumulator has a volumetric capacity which is larger than that of the cylinder so that the fluid in the cylinder may relocate to the accumulator.

The orifice 34 formed in the wall 36 of housing 18 provides the communication in flow from the cylinder. The orifice is sized such that the flow of fluid to which movement is imparted by movement of the piston in a crash environment is laminar in pattern at velocities of flow below the threshold velocity. In this event, fluid will flow into the accumulator, only a small pressure drop will exist across the orifice and the pressure in cylinder 30 is insufficient to provide an output. Under these conditions, substantially the total volume of fluid will relocate to the accumulator, while a small volume of fluid may exit the cylinder through the first bleed orifice and enter the conduit 16. This flow will have no effect on the release-reservoir unit for reason that substantially an equal volume of fluid will pass through the second bleed orifice into reservoir 38. As indicated previously, the second bleed orifice is of greater size and offers little or no resistance in the form of a throttling of the flow. At a velocity of flow which is equal to or greater than the threshold velocity, the orifice 34 provides a throttling action and as a consequence there is a build-up of pressure in the cylinder 30 as the level of turbulence increases. In a manner which will be described, the release-reservoir unit 14 is responsive to the described build-up of pressure within the cylinder resulting in deployment of the air bag within the confines of the automobile.

Within the theory of this particular invention, it will be realized that orifice 34 may be variously sized thereby to provide a throttling action to create turbulence of the fluid at different velocities of flow. Thus, the output may be obtained at different velocities of flow. To this end, the pressure within the cylinder is dependent upon the velocity of flow of the fluid whose movement is imparted by movement of the piston 40 controlled by the relative velocity of the vehicle with respect to the imparted object. If the flow velocity at least is equal to the threshold velocity, there will be an output. If the orifice size is increased, the level of the threshold velocity is increased and vice versa.

The sensing means 40 may be defined by alternate constructions although preferably it will be in the form of a piston described above. The piston is movable from the position in FIG. 1 against the compressive forces of spring 46 and since the piston 40 will be contacted and linearly displaced by the bumper or end portion of the vehicle on occasion of a crash, it is preferable that the piston be formed of a rigid material to withstand impact which may be significant.

The chamber of accumulator 32 is sealed by a piston 50 biased to the normal position of FIG. 1 by spring 54. The chamber of the accumulator is completely sealed except for the communication with the cylinder through orifice 34. An O-ring 52 prevents the fluid upon relocating to the accumulator from flowing from the left to the right side of piston 50. Thus, the fluid which shall enter the accumulator through the orifice causes piston to relocate from the FIG. 1 position against the loading force which relatively easily is overcome. The spring 54 is received between the piston and an annular ring 56 received in a cutout 58 in the housing 18.

The release-reservoir unit 14 likewise is formed by a housing 60 which is adapted to be mounted to the fire wall 62 of the vehicle which separates the engine compartment from the interior. To this end, the housing may include a flange 64 extending substantially therearound and formed with a plurality of spaced bores, each receiving a bolt 66 which may be threaded into the fire wall.

The housing 60 includes a pair of chambers 68 and 70 providing a reservoir and a release cylinder, respectively. As indicated previously, the reservoir is in fluid flow communication with the cylinder 30. The communication is provided by the release cylinder 70, bore 72 connecting the release cylinder with the tube 16 and a pair of flow paths 24 and 26. The flow path 24 terminates at a chamber 74. An opening 76 formed in housing 18 communicates the chamber 74 with the cylinder 30. A pressure release valve 78 during normal operation substantially seals the opening to the flow of fluid except through a bleed orifice 80 formed in the seat 82. A further bleed orifice 84 is provided between release cylinder 70 and the fluid reservoir 68. These bleed orifices not only provide communication of fluid but allow the system to breathe. Flow of fluid toward the main sensor unit 12 is assisted by the force of gravity in that the release-reservoir unit is disposed above the main sensor unit. This flow will completely fill the fluid system. A cap 86 may be releasably mounted on the housing 60 to close the opening to the reservoir 68. The cap may be in the form of a plate which may be bolted by bolts 88 or otherwise secured to the housing. A gasket (not shown) may be compressed between the underside of the cap and the housing thereby to provide a fluid seal.

The tube 16 is of a length to extend between the region of the firewall to which the release-reservoir unit 14 is secured and the front or rear of the chassis to which the main sensor unit 12 is secured. A connector 90 may be received on both ends of the tube 16 and may be threaded into a tapped bore communicating with the flow paths 26 and 72.

The release cylinder 70 is of a length to extend throughout a major portion of housing 60. The release cylinder includes a bore 92 which is concentric with yet of significantly smaller dimension than the release cylinder. The bore extends throughout a distance from the release cylinder substantially to the area of flange 64. A sealing member 94 is received in the release cylinder providing a seal at the opening of the cylinder in the housing. A piston 96 is positioned in release cylinder 70 for movement under control of pressure communicated to the release cylinder. The piston is biased by a loading spring 98 to the left (see FIG. 1) in juxtaposition to a stop 100. The stop may be in the form of an annular plate having a large central opening or some other form including a multiplicity of openings which provide no opposition to the flow and action of fluid against the face of the piston when the pressure release valve 78 shall open and communicate flow of fluid from the cylinder 30. The flow of fluid cannot be accommodated through the bleed orifice 84 and serves to pressurize the release cylinder thereby to move the piston 96 toward the right in the Figure in opposition to the loading force developed by spring 98. The piston is in the form of a spool having a pair of ends and a smaller connecting body. Such a construction is substantially incapable of binding in movement in the release cylinder when subject to the aforementioned forces in a crash environment. A rod 102 is supported by the release piston and extends throughout a distance into the bore 92.

A bore 104 is formed in housing 60 is a disposition which is perpendicular to the bore 92. The bore 104 is of a diameter somewhat equal to the diameter of bore 92 and intersects the latter within a region between its ends. The bore 104 is counterbored at 106 for purposes of receipt of a detonator or primer 108. And, as will be appreciated the axes of the bores are offset slightly.

Referring to FIGS. 2A and 2B, the manner of actuating the detonator or primer will readily become apparent. Thus, a firing pin 110 formed by an elongated rod-like body is located in bore 104 and biased in a direction toward bore 92. The firing pin supports a collar 112 between its ends and a spring 114 is disposed between the collar and the housing to provide this bias. The spring is a compression spring capable of providing a significant force when released. In the normal operating position, the collar 112 will be supported by rod 102 (See FIG. 2A). The rod includes a central cutout between its ends and the collar is supported by the rod adjacent the cutout. Thus, the rod maintains the end of firing pin 110 in a position slightly above the detonator 108. When the piston 96 shall be actuated into movement against the force of spring 98, the movement being one of rapid nature, collar 112 under the compressive force in spring 114 enters into the cutout. The rapid translation of the firing pin into the detonator 108 resulting in, for example, an evolvement of gases causes a deployment of the air bag within the confines of the vehicle for purposes described. The release cylinder and associated structure serves as a trigger.

A switch 116 is supported by the housing and may be connected by conductors 118 and 120 in any particular electrical circuit. The switch includes an operator 122 which is contacted by the other end of firing pin 110 thereby in the normal operating position to be held in the switch open position.

The ends of flow paths 24 and 28 are closed by plugs 124 and 126, respectively, and a bleed fitting 128 is received by the housing in communication with flow path 28 for purposes as are well known.

The pressure release valve 78 includes a ball valve 130 which is biased by a compression spring 132 against the seat 82. The spring is received around and supported by an operator 134. The operator includes a surface which is complimentary to that of the ball valve 130 thereby to be supported in juxtaposition to the ball valve and the spring rests on the ball valve in compression between the valve and the lower surface of the plug 136.

In the event of an impact, a level of shock will be transmitted to the bumper or end portion of the vehicle. In all likelihood, the bumper or end portion will yield or there will be a degree of deforming movement even at low speeds, and at some higher speeds the movement may be accompanied by severe deformation. This action will force the outer portion 44 of piston 40 inwardly of cylinder 30 against the action of spring 46 which will yield readily upon such displacement. Simultaneously, the fluid within the cylinder 30 will be caused to flow at some velocity and to exit the cylinder through orifice 34.

Should the relative velocity of the vehicle with respect to the impacted object result in a velocity of flow below a predetermined threshold velocity of, for instance, 12 mph, the flow will be laminar in pattern and there will be very little build-up of pressure in the cylinder 30. Whatever the level of pressure within the cylinder 30, it will be insufficient to overcome the loading on pressure release valve 78 and there will be no output. Thus, the detonator 108 will not be operated.

If the relative velocity of the vehicle with respect to the impacted object results in a velocity of flow at or above the threshold level, the detonator 108 will be actuated. In this connection, the flow of fluid through the orifice 34 is throttled, there is turbulence in the cylinder and a consequent increase in pressure. When the pressure in the cylinder 30 increases to the level which exceeds the loading of the pressure release valve 78, the pressure in the cylinder 30 is communicated to the release cylinder 70. This is followed by a rapid movement of piston 96 (to the right in FIG. 1) and operation of the firing pin 110. In practice, it has been determined that the response time between the actual displacement of piston 40 and the actuation of the detonator 108 is extremely short and in the range of approximately 1.5 to 2.5 milliseconds.

It will be further evident that, by virtue of the foregoing fluid arrangement, vibrations and other normal movement will not cause pressure to develop in the cylinder 30 which would cause actuation of the detonator 108.

It is by virtue of the pressure within the cylinder 30, developed by the velocity of movement of the piston 40 and the action of orifice 34 that the detonator 108 is actuated. Thus, the sensing apparatus advantageously utilizes the characteristics of fluid flow through an orifice to provide a true measure of the relative velocity of a vehicle with respect to an impacted object for purposes of actuating a detonator.

The sensing apparatus 10 will provide a rapid operating response whenever the threshold velocity is reached or exceeded. By way of specific example and not in a limiting sense, the impact sensing apparatus may be operated, for example, with a threshold velocity of 12 mph. Under these circumstances, if the relative velocity of the vehicle with respect to the impacted object is 11 mph, the response time is infinite since the fluid will flow a laminar pattern through orifice 34 into the accumulator 32. There will be little or no build-up of pressure in the cylinder. At a relative velocity of 12 mph, however, the response time may be on the order of 2 milliseconds. At a relative velocity of 30 mph, the response time may be on the order of 1.6 milliseconds. The foregoing illustrative values indicates that as the velocity of flow increases the response time decreases so that deployment of the air bag will occur within that time necessary for preventing the occupant of the automobile from developing a significant relative velocity with respect to the interior thereof.

With the sensing apparatus of the present invention, it is evident that the relative velocity of the vehicle with respect to the impacted object may be accurately measured. Accordingly, the sensing apparatus does not measure the deceleration magnitude of the automobile. This feature has significant importance from the standpoint that the crushing characteristics of the impacted object do not have an effect on the deployment of the air bag. Only the relative velocity of the vehicle with respect to that of the impacted object has an effect on such deployment.

In addition, the sensing apparatus is responsive independently of the manner the vehicle performs during a crash. Moreover, the sensing apparatus need not be manufactured to comply with specifications of any particular size and model of vehicle. Instead, since the sensing apparatus is a compact arrangement, it may be conveniently used on any size or model of vehicle and because of the manner of operation, it being mechanical in nature, a power loss will not effect the operation.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined in the appended claims.

What is claimed is:

1. Apparatus for use in activating inflation means for deploying an air bag upon impact of a vehicle with an impacted object when the relative velocity of the vehicle and the impacted object is at least equal to a threshold velocity, said apparatus comprising a sensing unit, means for mounting said sensing unit on for conjoint movement with said vehicle, said sensing unit having a pair of chambers, an orifice providing fluid communication between said chambers, sensing means disposed within one of said chambers and adapted to be displaced from a first position in response to forces of impact of said vehicle and impacted object, means in said other chamber normally closing said orifice, means for applying a loading force to said sensing means so that normally said sensing means locates to said first position, means including a reservoir for supplying a substantially non-compressible fluid to said one chamber so that the confined space between said sensing means and said closing means irrespective of the position of said sensing means is filled, said sensing means beng displaced from said first position in response to said forces for impelling said fluid to move before it at a velocity of flow from said one chamber and through said orifice to displace said closing means, said other chamber accumulating surges of said fluid upon displacement of said sensing means, said orifice being shaped and sized for throttling said flow of fluid from one said chamber when said velocity of flow is at least equal to said threshold velocity thereby causing a predetermined level of pressure to develop in said one chamber, output means including a pressure release valve and a valve seat, biasing means for loading said pressure release valve into closing disposition on said valve seat, said means for supplying fluid further including a first bleed orifice providing constant fluid communication with said one chamber, said first bleed orifice formed in said valve seat and said output means being responsive to the level of pressure in said one chamber and adapted to operate substantially instantaneously to communicate said predetermined pressure to for actuation of trigger means providing an input to said inflation means when said level of pressure shall at least equal said predetermined pressure.

2. The apparatus of claim 1 wherein said trigger means comprises a housing, a spring loaded firing pin adapted for movement toward a detonator of said inflation means, pressure responsive means, both said firing pin and pressure responsive means supported by said housing, means for biasing said pressure responsive means in one direction whereby said firing pin is latched, and a fluid line connecting said one chamber and said pressure responsive means whereby when said output means is operated said pressure responsive means is moved in the other direction to release said firing pin.

3. The apparatus of claim 2 wherein said pressure responsive means comprises a cylinder and a piston movable in said cylinder, and a second bleed orifice communicating said reservoir and cylinder.

4. The apparatus of claim 3 wherein said second bleed orifice has a flow capacity greater than said first bleed orifice to accommodate any flow of fluid exiting said one chamber under conditions when the level of pressure is less than said predetermined pressure.

5. An apparatus as set forth in claim 1 wherein said means in said other chamber includes a piston member, and a spring member interposed between said sensing unit and said piston member for urging said piston member in the orifice closing direction when said forces of impact shall have been removed, yet yielding upon displacement of said sensing means to accumulate said surges of fluid.

6. An apparatus as set forth in claim 1 wherein said sensing means includes a piston member, said piston member being displaceable from said first position when displaced by a bumper or the like in response to said impact of said vehicle with said impacted object to force said fluid through said orifice.

7. An apparatus as set forth in claim 6 wherein said fluid will flow in substantilaly a laminar pattern under control of said piston member when said relative velocity is below said threshold velocity and said flow will be throttled by said orifice at said threshold velocity thereby to become turbulent whereby pressure in said one chamber builds to said predetermined pressure level.

8. Apparatus for use in commencing inflation of an air bag for purposes of occupant restraint in response to a collision of a vehicle with an obstruction, comprising housing means being affixed to the vehicle for conjoint movement therewith, said housing means providing therein a cylinder, an orifice in fluid communication with said cylinder, and sensing means adapted for displacement within said cylinder in response to impact forces imparted thereto by the obstruction, means including a reservoir for supplying fluid in sufficient volume to fill said cylinder, said fluid being impelled into movement at a flow velocity under control of said sensing means through said orifice, said orifice being shaped and sized for creating at least a predetermined pressure level within the cylinder when said fluid shall have a velocity at least equal to a predetermined threshold velocity, said housing means further including an expansion chamber in fluid communication with said cylinder through said orifice for accumulating surges of said fluid whenever said sensing means is displaced from a limit position, output means responsive to the pressure in said cylinder and adapted to be actuated when said predetermined level indicative of the attainment of a velocity of flow equal to at least the threshold velocity, said output means including a pressure release valve and a valve seat, biasing means for loading said pressure release valve into closing disposition on said valve seat, said means for supplying fluid further including a first bleed orifice providing constant fluid communication with said cylinder, said first bleed orifice formed in said valve seat, trigger means including a pressure responsive member biased in one direction to latch a firing pin and movable in the other direction upon response of said output means to said predetermined level of pressure, and means providing a fluid connection between said pressure responsive means and said cylinder whereby when said output means shall have been actuated said predetermined level of pressure substantially instantaneously is communicated to said pressure responsive member to unlatch said firing pin.

* * * * *